(12) United States Patent
Liu et al.

(10) Patent No.: US 8,328,898 B2
(45) Date of Patent: Dec. 11, 2012

(54) ENVIRONMENT-FRIENDLY CARBON-NANO SYNERGISTIC COMPLEX FERTILIZERS

(76) Inventors: Jian Liu, Guangdong (CN); Zhiming Zhang, Liaoning (CN)

(*) Notice: Subject to any disclaimer, the term of this patent is extended or adjusted under 35 U.S.C. 154(b) by 353 days.

(21) Appl. No.: 12/672,951

(22) PCT Filed: Aug. 11, 2008

(86) PCT No.: PCT/CN2008/001444
§ 371 (c)(1),
(2), (4) Date: Feb. 10, 2010

(87) PCT Pub. No.: WO2009/021401
PCT Pub. Date: Feb. 19, 2009

(65) Prior Publication Data
US 2011/0174032 A1 Jul. 21, 2011

(30) Foreign Application Priority Data
Aug. 10, 2007 (CN) .......................... 2007 1 0142932

(51) Int. Cl.
*C05C 9/00* (2006.01)
*C05D 9/02* (2006.01)
(52) U.S. Cl. ................................. 71/28; 71/63
(58) Field of Classification Search ................ 71/11–30, 71/63; 47/58.1 SC
See application file for complete search history.

(56) References Cited

U.S. PATENT DOCUMENTS

| 3,197,302 | A  | * | 7/1965  | MacBride    | 71/37   |
|-----------|----|---|---------|-------------|---------|
| 4,309,206 | A  | * | 1/1982  | Michaud et al. | 71/28 |
| 5,352,265 | A  | * | 10/1994 | Weston et al. | 71/29 |
| 6,447,437 | B1 | * | 9/2002  | Lee et al.  | 588/250 |
| 2004/0163434 | A1 | * | 8/2004 | Quin       | 71/28   |
| 2009/0013743 | A1 | * | 1/2009 | Lynch et al. | 71/17  |

FOREIGN PATENT DOCUMENTS

| CN | 1053225 A | 7/1991 |
| CN | 1109038 A | 9/1995 |
| CN | 1314329 A | 9/2001 |
| CN | 1380272 A | 11/2002 |
| CN | 1579932 A | 2/2005 |
| WO | WO 2006/116014 | * 11/2006 |

* cited by examiner

*Primary Examiner* — Wayne Langel
(74) *Attorney, Agent, or Firm* — Laurence A. Greenberg; Werner H. Stemer; Ralph E. Locher

(57) ABSTRACT

The present invention relates to environment-friendly, synergistic carbon-nano complex fertilizers comprising carbon-containing-fertilizer. The complex fertilizers comprise carbon nanomaterials, which have the particle size in a range from 5 nm to 200 nm and particularly 5 nm to 100 nm, and optional ammonia stabilizer or nitric acid reductase inhibitor. The weight ratio of the carbonic fertilizer and the carbon nanomaterials is in a range from 100:0.1 to 100:1. The weight ratio of the carbon-containing-fertilizer and the ammonia stabilizer or nitric acid reductase inhibitor is in a range from 100:0.1 to 100:1. Said carbon-containing-fertilizer is ammonium bicarbonate, urea, or a combination thereof. The complex fertilizers show synergistic emission reduction. The present invention also relates to compound fertilizers, which comprise said complex fertilizer and organic fertilizer.

26 Claims, No Drawings

ENVIRONMENT-FRIENDLY CARBON-NANO SYNERGISTIC COMPLEX FERTILIZERS

FIELD OF INVENTION

The present invention relates to carbon-containing-fertilizer, specially relates to carbon-containing-fertilizer which could reduce green house gas emission.

BACKGROUND

Carbon-containing-fertilizer mainly refers to ammonium bicarbonate and urea, which are the main fertilizers in agricultural production in China.

Ammonium bicarbonate fertilizer is suitable for all kinds of soil and crops as a chemical nitrogen fertilizer, which has high fertilizer efficiency and no soil acidification effect. However, this fertilizer is defected in that it easily undergoes decomposition when high temperature and moisture present, and it has low nitrogen utilization rate of 25% to 30%, and a short longevity of fertilizer for 30 to 40 days.

Urea fertilizer is one of the most important solid nitrogenous fertilizers, which has the advantages of high nitrogen contents, low cost, easily dissolved in water, and easily being processed. The main problem existing in urea fertilizer is that it rapidly hydrolyzes to ammonium carbonate in soil, which on the one hand causes the elevated pH value of soil and accumulation of ammonia, producing nitrite and ammonia poisoning; on the other hand, urea largely evaporates in gaseous form after transforming into ammonia, and the wastage rate might be over 50%.

CN1053225A discloses a long effective ammonium bicarbonate fertilizer and the preparation method thereof, which is incorporating low amount of dicyandiamide (DCD) into ammonium bicarbonate to form co-crystallization or mixture. The preparation process thereof is to use and improve the ammonium bicarbonate production process. The fertilizer increases nitrogen utilization rate of ammonium bicarbonate by 25% to 30%, prolongs the longevity of fertilizer by 40 to 60 days, reduces the fertilizing amount by 20% to 30%, and changes fertilizing method from applying additional fertilizer to applying base fertilizer before sowing, saving the process of additional fertilizer application. Additionally, it increases production obviously, and the production increasing range is over 10%.

CN1109038 discloses that DCD, lignite, sodium tetraborate, and zinc sulfate are used together with urea or ammonium bicarbonate to increase nitrogen utilization rate of the fertilizer.

However, ammonium bicarbonate and urea fertilizers synergized by DCD currently still could not meet the increasingly serious challenge of the green house gas emission.

Therefore, the objects of the present invention are to reduce the decomposition of carbon-containing-fertilizer, to reduce the green house gas emission, and to increase the production at the same time by incorporating carbon-nano constituting agent into fertilizers which mainly comprise carbon-containing-fertilizer.

SUMMARY OF INVENTION

In order to achieve the objects above, the present invention provides a complex fertilizer, which comprises carbon-containing-fertilizer selected from ammonium bicarbonate, urea, or a combination thereof, and carbon nanomaterials with the particle size in a range from 5 nm to 200 nm, and the weight ratio of said carbon-containing-fertilizer and said carbon nanomaterials is in a range from 100:0.1 to 100:1.

In a preferred embodiment, the weight ratio of said carbon-containing-fertilizer and carbon nanomaterials is in a range from 100:0.1 to 100:0.5.

In a preferred embodiment, the weight ratio of said carbon-containing-fertilizer and carbon nanomaterials is in a range from 100:0.1 to 100:0.3.

In a preferred embodiment, the particle size of carbon nanomaterials is in a range from 5 nm to 100 nm.

In a preferred embodiment, said complex fertilizer further comprises ammonia stabilizer or nitric acid reductase inhibitor, the weight ratio of said carbon-containing-fertilizer and said ammonia stabilizer or nitric acid reductase inhibitor is in a range from 100:0.1 to 100:1, and said ammonia stabilizer or nitric acid reductase inhibitor is selected from a group consisting of dicyandiamide, dicyclohexylamine, 2-diethylaminoethanol, benzyl cyanide, glyceryl triacetate, nitroaniline, 2-chloropyridine, 3-chloroacetoacetanilide, N-nitrosodimethylamine and sulfathiazole.

In a preferred embodiment, said ammonia stabilizer or nitric acid reductase inhibitor is dicyandiamide.

In a preferred embodiment, the weight ratio of said carbon-containing-fertilizer and dicyandiamide is in a range from 100:0.1 to 100:0.5.

In a preferred embodiment, the weight ratio of said carbon-containing-fertilizer and dicyandiamide is in a range from 100:0.1 to 100:0.3.

In a preferred embodiment, said carbon-containing-fertilizer is ammonium bicarbonate, said complex fertilizer further comprises carbon nanomaterials with the particle size in a range from 5 nm to 100 nm and dicyandiamide, the weight ratio of said carbon-containing-fertilizer and said carbon nanomaterials is in a range from 100:0.1 to 100:0.5, and the weight ratio of said carbon-containing-fertilizer and dicyandiamide is in a range from 100:0.1 to 100:0.5.

In a preferred embodiment, the weight ratio of said carbon-containing-fertilizer and said carbon nanomaterials is in a range from 100:0.1 to 100:0.3, and the weight ratio of said carbon-containing-fertilizer and dicyandiamide is in a range from 100:0.1 to 100:0.3.

In a preferred embodiment, said carbon-containing-fertilizer is urea, said complex fertilizer further comprises carbon nanomaterials with the particle size in a range from 5 nm to 100 nm, and the weight ratio of said carbon-containing-fertilizer and said carbon nanomaterials is in a range from 100:0.1 to 100:0.5.

In a preferred embodiment, the weight ratio of said carbon-containing-fertilizer and said carbon nanomaterials is in a range from 100:0.1 to 100:0.3.

In a preferred embodiment, the particle size of said carbon nanomaterial is in a range from 5 nm to 20 nm.

The present invention also provides a method for preparing a complex fertilizer, which comprises carbon-containing-fertilizer selected from ammonium bicarbonate, urea, or a combination thereof. The method comprises the steps of co-crystallizing or mixing thoroughly carbon nanomaterials with particle size in a range from 5 nm to 200 nm and said carbon-containing-fertilizer during carbon-containing-fertilizer preparation, in which the weight ratio of said carbon-containing-fertilizer and said carbon nanomaterials is in a range from 100:0.1 to 100:1.

In a preferred embodiment, the weight ratio of said carbon-containing-fertilizer and said carbon nanomaterials is in a range from 100:0.1 to 100:0.5.

In a preferred embodiment, the weight ratio of said carbon-containing-fertilizer and said carbon nanomaterials is in a range from 100:0.1 to 100:0.3.

In a preferred embodiment, the particle size of said carbon nanomaterials is in a range from 5 nm to 100 nm, and preferably 5 nm to 70 nm.

In a preferred embodiment, ammonia stabilizer or nitric acid reductase inhibitor is incorporated into said carbon-containing-fertilizer before or during the steps of co-crystallizing or mixing thoroughly said carbon nanomaterials and said carbon-containing-fertilizer, in which the weight ratio of said carbon-containing-fertilizer and said ammonia stabilizer or nitric acid reductase inhibitor is in a range from 100:0.1 to 100:1, and said ammonia stabilizer or nitric acid reductase inhibitor is selected from a group consisting of dicyandiamide, dicyclohexylamine, 2-diethylaminoethanol, benzyl cyanide, glyceryl triacetate, nitroaniline, 2-chloropyridine, 3-chloroacetoacetanilide, N-nitrosodimethylamine and sulfathiazole.

In a preferred embodiment, said ammonia stabilizer or nitric acid reductase inhibitor is dicyandiamide.

In a preferred embodiment, the weight ratio of said carbon-containing-fertilizer and dicyandiamide is in a range from 100:0.1 to 100:0.5.

In a preferred embodiment, the weight ratio of said carbon-containing-fertilizer and dicyandiamide is in a range from 100:0.1 to 100:0.3.

In a preferred embodiment, said carbon-containing-fertilizer is ammonium bicarbonate, and the method comprises co-crystallizing or mixing thoroughly carbon nanomaterials with the particle size in a range from 5 nm to 100 nm, dicyandiamide and said ammonium bicarbonate during the preparation of ammonium bicarbonate, in which the weight ratio of said carbon-containing-fertilizer and said carbon nanomaterials is in a range from 100:0.1 to 100:0.5, and the weight ratio of said carbon-containing-fertilizer and dicyandiamide is in a range from 100:0.1 to 100:0.5.

In a preferred embodiment, the weight ratio of said carbon-containing-fertilizer and said carbon nanomaterials is in a range from 100:0.1 to 100:0.3, and the weight ratio of said carbon-containing-fertilizer and dicyandiamide is in a range from 100:0.1 to 100:0.3.

In a preferred embodiment, said carbon-containing-fertilizer is urea, and the method comprises co-crystallizing or mixing thoroughly carbon nanomaterials with the particle size in a range from 5 nm to 100 nm and said urea during the preparation of urea, in which the weight ratio of said carbon-containing-fertilizer and said carbon nanomaterials is in a range from 100:0.1 to 100:0.5.

In a preferred embodiment, the weight ratio of said carbon-containing-fertilizer and said carbon nanomaterials is in a range from 100:0.1 to 100:0.3.

In a preferred embodiment, the particle size of said carbon nanomaterials is in a range from 5 nm to 70 nm, and preferably 5 nm to 20 nm.

In a preferred embodiment, the present invention also provides a compound fertilizer, which comprises the complex fertilizer according to the present invention in an amount of 5-90%, and preferably 10-95% of the total weight of said compound fertilizer.

DETAILED DESCRIPTION

As used herein, the transition term "comprising", which is synonymous with "having", "including", or "be characterized in", is inclusive or open-ended, and does not exclude additional unstated essential factors or methods and steps, which is irrelevant to being used in preamble portion or characterizing portion of the claims.

As used herein, carbon-containing-fertilizer is ammonium bicarbonate, urea or a combination thereof. Complex fertilizers, compound fertilizers, and so forth, which comprise ammonium bicarbonate and/or urea in other form, are also included in the scope of the present invention.

"Carbon nanomaterials" as used herein is carbon nanomaterials prepared from nano-graphite-carbon-collosol by the impulse process according to Chinese Patent No. 03153360.4, in which high purity graphite is used as an anode, and inert electrode material is used as a cathode; and the nano-graphite-carbon-collosol is then dispersed by lignosulfonate with molecular weight larger that 4000 KDa, dried, and grinded. The particle size of "carbon nanomaterials" prepared by this way is in a range from 5 nm to 200 nm, and generally 15 nm to 50 nm.

The production process of carbon-containing-fertilizer, especially ammonium bicarbonate, is addition reaction of $CO_2$, $H_2O$, and $NH_3$ compounds to form a molecular cluster compound. The molecular cluster compound of ammonium bicarbonate is a loose polymer with water content above 3%. Water is a catalyst, which decomposes and evaporates ammonium bicarbonate. Therefore, after ammonium bicarbonate containing $CO_2$ above 56% applied to soil, it decomposes to $NH_3$ and $CO_2$ emitting into atmosphere, which causes greenhouse effects. In the present invention, carbon-nano with the particle size in a range from 5 nm to 200 nm, preferably 5 nm to 100 nm, especially 5 nm to 70 nm, is incorporated into the production process of ammonium bicarbonate fertilizer. The nano-scale carbon-nano are filled into the loose structure of ammonium bicarbonate molecular cluster compound in the ammonium bicarbonate complex fertilizer obtained. Therefore, the loose structure of ammonium bicarbonate is changed, and the water content of ammonium bicarbonate cluster is reduced, which results in the structure compact, converts disordered structure to ordered structure, increases the thermal stability and water stability, and reduces the evaporation of the ammonium bicarbonate. Functional action of carbon-nano directly reduces the green house gas emission.

Nitrogen fertilizers applied to soil generally enter soil in the form of ammonium nitrogen, and convert into nitrate nitrogen by soil nitrate reductase, which is easily absorbed by plants. However, the nitrate nitrogen can not be completely absorbed by plants due to the fast converting speed and accumulation, which causes leaching and denitrification to lose a large amount of nitrogen, and the diffused pollution of rivers and lakes. Nitrate nitrogen produced by denitrification is a strong carcinogen. Nitrite nitrogen can further form a large amount of nitrous oxide ($N_2O$). When fertilized generally, the annual emission of nitrous oxide ($N_2O$) is 1% to 4% of nitrogen application amount, and carbon tax of one ton nitrous oxide ($N_2O$) is equal to carbon tax of 310 tons $CO_2$. Nitrous oxide ($N_2O$) is a green house gas which is extremely destructive to ozone layer. However, ammonium bicarbonate combined with carbon-nano could delay the converting process from ammonium nitrogen to nitrate nitrogen and nitrite nitrogen, and further reduce the nitrous oxide ($N_2O$) emission. Results of field experiments show that application of ammonium bicarbonate combined with carbon-nano reduces the nitrous oxide ($N_2O$) emission by over 70%, comparing with ammonium bicarbonate and urea.

Since ammonium bicarbonate is soluble in water and decomposes when heated, it has to control the ammoniacal nitrogen in soil effectively and inhibit denitrification in order to maintain the nitrogen in soil after fertilized. According to existing research results, ammonium bicarbonate could maintain fertilizer efficiency during a long period by incorporated with a proper amount of ammonia stabilizer or nitric acid reductase inhibitor. Ammonia stabilizers (or curing agents) used are, for instance, dicyandiamide, dicyclohexylamine, 2-diethylaminoethanol, benzyl cyanide or glyceryl triacetate, and the like; nitric acid reductase inhibitor used are, for instance, nitroaniline, 2-chloropyridine, 3-chloroacetoacetanilide, N-nitrosodimethylamine, sulfathiazole or dicyandiamide, and the like. Ammonium bicarbonate and a proper amount of ammonia stabilizer and nitric acid reductase inhibitor could form co-crystallization or particle fertilizer by mixing thoroughly. Dicyandiamide (DCD) is a preferred compound among the ammonia stabilizers and nitric acid reductase inhibitors above.

DCD is an ammonia stabilizer, and also a nitric acid reductase inhibitor, whose molecular formula is $N_4H_4C_2$. DCD is a white crystalline solid, slightly soluble in water, ethanol, and ammonia solution, which is a slowly releasing nitrogen fertilizer, and could decompose into guanidine urine and urea while reacting with water, doing no harm to soil and plants. Incorporating DCD into ammonium bicarbonate could reduce the evaporation loss of ammonium bicarbonate by 52%, and increase the adsorption fixation of $NH_4^+$ in soil by 64%. $NH_4^+$ and $HCO_3^-$ are balanced with each other in soil. Primary amino group and secondary amino group are present in the structure of DCD, which could adsorb the free $NH_4^+$ by their hydrogen binding adsorption function, and fix $HCO_3^-$ to reduce the evaporation loss of $CO_2$. Meanwhile, since DCD is a nitric acid reductase inhibitor, incorporating DCD into ammonium bicarbonate fertilizer could slow down the reaction process of ammonium nitrogen converting to nitrate nitrogen, which means reducing the nitrogen loss in soil caused by leaching and denitrification, as well as the chemical fertilizer pollution in groundwater source. Also, incorporating DCD into ammonium bicarbonate fertilizers could slow down the process of ammonium nitrogen converting to nitrate nitrogen and nitrite nitrogen, and thereby reduce the nitrous oxide ($N_2O$) emission.

Synergistic fertilizers with excellent property obtained by incorporating carbon-nano and DCD into ammonium bicarbonate fertilizers could be applied as early additional fertilizer or base fertilizer before sowing without additional fertilizer. The amount of carbon-nano and DCD addictives incorporated into synergistic ammonium bicarbonate used as additional fertilizer is 0.3% to 0.5% by weight of synergistic ammonium bicarbonate; while the amount of the addictives incorporated into synergistic ammonium bicarbonate used as base fertilizer is 0.6% to 1.2% by weight of synergistic ammonium bicarbonate.

Studies show that the effects of production increase and emission reduction are obvious after the combination of ammonium bicarbonate and carbon nanomaterials, and the effects are further enhanced when combined with DCD. Also, the production increase and emission reduction effects are obviously achieved by the combination of urea and an amount of carbon nanomaterials.

The complex carbon-containing-fertilizer in the present invention could be produced using known preparing methods and equipment for producing long effective ammonium bicarbonate incorporated DCD addictive, which are described in detail in "*Novel Nitrogen Fertilizer-Long Effective Ammonium Bicarbonate*", Zhiming Zhang, Yuanqi Feng et al. (Chemical Industry Press, the $1^{st}$ version, January, 2000). In the present invention, carbon-nano, or the combination of carbon-nano and ammonia stabilizer or nitric acid reductase inhibitor, could be directly incorporated into ammonium bicarbonate crystal formed in ammonium bicarbonate production process to prepare particle fertilizer by mixing. Alternatively, in the present invention, carbon-nano, or the combination of carbon-nano and ammonia stabilizer or nitric acid reductase inhibitor, could be incorporated into ammonium bicarbonate production process in solution form, preferably concentrated ammonia water, or dissolved in dilute ammonia water and carbonized mother liquid, thereby co-crystallizing with ammonium bicarbonate prepared by said process, and therefore, achieving a better effect.

The combination of urea and carbon nanomaterials could be realized by using the production process of carbon-nano synergistic ammonium bicarbonate above, i.e., by mixing. Co-crystallizing carbon nanomaterials and urea could achieve a better effect by directly incorporating carbon nanomaterials into urea production process.

Specifically, process below could be used for preparation.

Ammonia is absorbed by water to produce 20% concentrated ammonia water; carbon dioxide is compressed by compressor to enter an air cooler and is cooled to 40° C.; carbon dioxide contacts in a counter flow with concentrated ammonia water in the bottom of a carbonation auxiliary column to produce carbonated ammonia solution; carbonated ammonia solution contacts in a counter flow with carbon dioxide in the bottom of a carbonation main column to produce ammonium bicarbonate crystal slurry; ammonia (3%) from the exit of the carbonation column is recovered in ammonia recovery column containing soft water; carbon-nano and DCD are added through storage tank; meter controls carbon-nano and DCD output amounts; carbon-nano and DCD addictives are incorporated by a powder sprayer; ammonium bicarbonate crystal slurry and carbon-nano and DCD addictives are mixed by a mixer; by means of a crystal slurry pump, the mixture of ammonium bicarbonate, carbon-nano and DCD is sent into a thickener through allotting tank; the thickener is equipped with agitator and a cooling jacket, which cool the crystal slurry such that the crystal may grow larger; the mother liquid in the upper layer of the thicker returns mother liquid tank; and the thick crystal slurry of ammonium bicarbonate, carbon-nano and DCD in lower layer discharges into a centrifuge separator (Φ800 rotor, 650 rpm), and the finished product is obtained after dehydration.

Alternatively, certain amount of carbon-nano and DCD are dissolved in concentrated ammonia water first, and then enter into the carbonation column to undergo carbonation. Concentrated ammonia water absorbs carbon dioxide to produce ammonium bicarbonate solution, and the ammonium bicarbonate solution further absorbs carbon dioxide to produce ammonium bicarbonate crystal. At the same time of forming ammonium bicarbonate crystal slurry, carbon-nano and DCD are crystallized inside the ammonium bicarbonate crystal as crystal seed, and thereby co-crystal of ammonium bicarbonate, carbon-nano and DCD is formed, which then enters into a thicker and a separating system, produces finished carbon-nano synergistic ammonium bicarbonate.

Alternatively, ammonium bicarbonate discharged from centrifuge separator is imported directly into a rotating agitator, which is connected to magnetic vibrator and storage tank. Certain amount of carbon-nano and DCD addictives are imported into the agitator by the vibrator, admixed with ammonium bicarbonate, and kneaded to produce carbon-nano synergistic ammonium bicarbonate after forward and backward rotatory agitating procedures.

In the descriptions below, lots of specific details are elaborated for the purpose of interpretation in order to provide a complete understanding of the present invention. However, those skilled in the art are clear that the present invention could be achieved without these specific details. Any variation of the inventive concept is within the scope and spirit of the present invention. In this regard, specific exemplary embodiments are only used to illustrate the present invention, not to restrict it. Hence, the scope of the present invention is not defined by the specific examples provided, but only determined by the representation of the claims.

Below the preparing methods of said nano synergistic carbon-containing-fertilizer are specified by examples of using carbon-nano as well as carbon-nano and DCD as addictives to prepare ammonium bicarbonate complex fertilizer and using carbon-nano as an addictive to prepare urea complex fertilizer. In these examples, DCD is medical grade dicyandiamide, carbon-nano is 5 nm to 70 nm carbon-nano powder prepared by Shenzhen Nano Innovation Technology Co., Ltd. Ammonium bicarbonate and urea used are fertilizer masterbatch produced by domestic fertilizer plants, and dicyandiamide used could be products from Ninxia Darong Company and the like.

EXAMPLES

Example 1

Carbon-nano and DCD are incorporated into ammonium bicarbonate at ratios below, and form carbon-nano synergistic fertilizers by admixing process. The products are as follows:

| Product Codes | Parts by weight of carbon-nano in every 100 parts by weight of ammonium bicarbonate | Parts by weight of DCD in every 100 parts by weight of ammonium bicarbonate |
| --- | --- | --- |
| 0.0%; ordinary ammonium bicarbonate (ABC) | 0 | 0 |
| 0.1% carbon-nano; ordinary ammonium bicarbonate (CABC-01-00) | 0.1 | 0 |
| 0.3% carbon-nano; ordinary ammonium bicarbonate (CABC-03-00) | 0.3 | 0 |
| 0.0%; long effective ammonium bicarbonate (LEABC) | 0 | 0.3 |
| 0.1% carbon-nano; long effective ammonium bicarbonate (CABC-01-03) | 0.1 | 0.3 |
| 0.3% carbon-nano; long effective ammonium bicarbonate (CABC-03-03) | 0.3 | 0.3 |

Example 2

Urea is used as a fertilizer masterbatch, and carbon-nano is used as an addictive. These two substances are mechanically mixed evenly to form urea based carbon-nano synergistic fertilizer, in which carbon-nano addictive evenly coated on the surface of urea. The obtained products are as follows:

| Product Codes | Parts by weight of carbon-nano in every 100 parts by weight of urea |
| --- | --- |
| Ordinary Urea (URA) | 0 |
| 0.1% carbon-nano synergistic urea (CURA-01) | 0.1 |
| 0.3% carbon-nano synergistic urea (CURA-03) | 0.3 |

Example 3

7000 g CABC-03-03 prepared in Example 1 is mixed with 10000 g organic fertilizer (decomposed organic material) to produce organic/inorganic compound fertilizer comprising carbon-nano synergistic fertilizer.

Example 4

7000 g CURA-03 prepared in Example 2 is mixed with 10000 g organic fertilizer (decomposed organic material) to produce organic/inorganic compound fertilizer comprising carbon-nano synergistic fertilizer.

Experiment 1

Fertilizer Efficiency Experiment of Carbon-Nano Synergistic Ammonium Bicarbonate (1)

Indoor simulation experimental results of ammoniacal nitrogen fixation through different amount of carbon-nano synergistic ammonium bicarbonate applied to soil are showed in Table 1. After 125 days indoor culture, ammoniacal nitrogen contents in soil applied with ammonium bicarbonate without addictives are lowest, recorded as 0%, while the retention ratios of ammoniacal nitrogen in soil applied with synergistic ammonium bicarbonate incorporated carbon-nano and DCD obviously increase to 37%, 36%, 26% and 19% respectively. Along with the increasing of carbon-nano and DCD content, the adsorption capacity increases, which enables $NH_4$—N to be semi-permanently adsorbed, and to be difficult to released during a short period of time. Therefore, the released amount of ammoniacal nitrogen decreases while the amount of carbon-nano and DCD addictives increases. Thus, it is very important to choose appropriate amount of carbon-nano and DCD used for ammonia fixation. The appropriate amount of DCD is 0.3% to 1.0%, and the appropriate amount of carbon-nano is 0.1% to 0.8%, which could increase the retention ratio of ammoniacal nitrogen in soil by 30%.

TABLE 1

Simulation experiments of ammoniacal nitrogen fixation by carbon-nano and DCD

| | carbon-nano amounts* | | | | | |
| --- | --- | --- | --- | --- | --- | --- |
| | 0 | 0.1 | 0.2 | 0.3 | 0.4 | 0.5 |
| DCD amounts* | 0 | 0.1 | 0.2 | 0.3 | 0.4 | 0.5 |
| $NH_4$—N accumulation in soil in 125 days (mg/100 g) | 81 | 111 | 110 | 105 | 102 | 95 |
| Retention ratio of $NH_4$—N in soil (%) | 0 | 37 | 36 | 29 | 26 | 19 |

*The amount used in every 100 g ammonium bicarbonate (g)

Experiment 2

Fertilizer Efficiency Experiment of Carbon-Nano Synergistic Ammonium Bicarbonate (2)

As in Table 2, the formation time and quantities of nitrate nitrogen ($NO_3$—N) in different treatments and control samples are determined by stages in 125 days. Amounts of nitrate nitrogen formed in carbon-nano synergistic ammonium bicarbonate (contents of addictives are 0.1% to 1%) (contents of DCD and carbon-nano are half and half) reduce to 69%, 49%, 49%, and 39% respectively, while amount of nitrate nitrogen formed in ordinary ammonium bicarbonate is 100. The forming time of nitrate nitrogen ($NO_3$—N) also delays about 30 days, and effects of inhibiting ammonium nitrogen converting to nitrate nitrogen are enhanced along with the increase of the amount of carbon-nano and DCD addictives, which could reduce the forming amount of nitrate nitrogen in soil by 30% to 60%.

TABLE 2

Carbon-nano and DCD could reduce the forming amount of $NO_3$—N and delay the forming time.

|  | Amount of carbon-nano used* | | | | | |
|---|---|---|---|---|---|---|
|  | 0 | 0.1 | 0.2 | 0.3 | 0.4 | 0.5 |
| Amount of DCD used* | 0 | 0.1 | 0.2 | 0.3 | 0.4 | 0.5 |
| Forming amount of $NO_3$—N (mg/100 g) | 172 | 119 | 71 | 84 | 84 | 67 |
| Forming ratio of $NO_3$—N (%) | 100 | 69 | 41 | 49 | 49 | 39 |
| Peak time of $NO_3$—N formed (days) | 35 | 35 | 65 | 65 | 65 | 65 |
| Peak amount of $NO_3$—N formed (%) | 6.5 | 3.5 | 2.3 | 2.5 | 3.0 | 2.0 |

*Amounts used in every 100 g ammonium bicarbonate (g)

Experiment 3

Increasing Rate Experiments on Ion Concentration Ratio of $HCO_3^-/CO_3^=$ in Carbon-Nano Synergistic Ammonium Bicarbonate Carbonate ion concentration ratio of $HCO_3^-/CO_3^=$/% in soil is affected obviously by carbon-nano synergistic ammonium bicarbonate. Increasing rate of $HCO_3^-/CO_3^=$ ion concentration ratio with carbon-nano synergistic ammonium bicarbonate are 238.35% after 2 days, and 8.42% after 19 days, showed in Table 3. The emission process of $CO_2$ is the alkalization process of $HO^-$ entering the solution. When the forming amount of $CO_3^=$ in soil solution increases, the emission loss of $CO_2$ increases, and the ratio of $HCO_3^-/CO_3^=$ reduces comparatively; when the stability of $HCO_3^-$ is required to be enhanced, the ratio of $HCO_3^-/CO_3^=$ increases comparatively. It indicates that the stability of $HCO_3^-$ in soil applied with carbon-nano synergistic ammonium bicarbonate is obviously higher than that of ordinary ammonium bicarbonate, and then the possibility of $HCO_3^-$ combined with $Ca^{++}$, $Mg^{++}$ ions in soil to form $CaCO_3$ and $MgCO_3$ increases.

TABLE 3

Ion concentration ratio changes of $HCO_3^-/CO_3^=$ in 1 mol/L carbon-nano synergistic ammonium bicarbonate (CABC-03-03) and ordinary ammonium bicarbonate (ABC) solutions (298k)

| Test time/d | Ordinary ammonium bicarbonate ($HCO_3^-/CO_3^=$) | Carbon-nano synergistic ammonium bicarbonate ($HCO_3^-/CO_3^=$) | Increasing rates of $HCO_3^-/CO_3^=$ (carbon-nano synergistic ammonium bicarbonate vs. ordinary ammonium bicarbonate) (%) |
|---|---|---|---|
| 0 | 380 | 360 | −5.55 |
| 0.125 | 230 | 240 | 4.35 |
| 0.25 | 80 | 160 | 100.00 |
| 1 | 21 | 76 | 261.90 |
| 2 | 13.3 | 45 | 238.35 |
| 3 | 10.4 | 29 | 178.51 |
| 6 | 8.6 | 16.9 | 96.81 |
| 9 | 8.2 | 12.6 | 53.66 |
| 13 | 9.3 | 11.8 | 25.88 |
| 16 | 9.3 | 10.7 | 15.05 |
| 19 | 9.5 | 10.3 | 8.42 |

Experiment 4

Reducing Rate Experiments on Ion Concentration Ratio of $HCO_3^-/H_2CO_3$ in Carbon-Nano Synergistic Ammonium Bicarbonate The amount of $HCO_3^-/H_2CO_3$ existing in soil is important for promoting root development, improving the environment around the roots, and is playing an important role of buffering by reducing the pH increased by fertilizer application in soil. Therefore, determination of $HCO_3^-/H_2CO_3$ ratios could sufficiently show whether the soil conditions are good or not. Experimental results in Table 4 indicate that the amount of $H_2CO_3$ is higher in soil applied with carbon-nano synergistic ammonium bicarbonate than that in soil applied with ammonium bicarbonate, and this higher $H_2CO_3$ amount makes $HCO_3^-/H_2CO_3$ ratio reduce. The ratio with carbon-nano synergistic ammonium bicarbonate is 249.11% lower than ammonium bicarbonate on the second day and 8.06% lower on the $19^{th}$ day. Since the evaporation loss of ammonia is highest on the $15^{th}$ day after fertilizer application, during this period, lower pH value caused by stabilized $H_2CO_3$ in soil could obviously reduce the evaporation of ammonia and the emission of green house gas $CO_2$, and then increase the nitrogen utilization ratio, and prolong the longevity of the fertilizer.

TABLE 4

Ion concentration ratio changes of $HCO_3^-/H_2CO_3$ in 1 mol/L carbon-nano synergistic ammonium bicarbonate (CABC-03-03) and ammonium bicarbonate (ABC) solutions (298k)

| Test time/d | Ordinary ammonium bicarbonate ($HCO_3^-/H_2CO_3$) | Carbon-nano synergistic ammonium bicarbonate ($HCO_3^-/H_2CO_3$) | Increasing rates of $HCO_3^-/H_2CO_3$ (carbon-nano synergistic ammonium bicarbonate vs. ordinary ammonium bicarbonate) (%) |
|---|---|---|---|
| 0 | 20 | 21 | −5.00 |
| 0.125 | 33 | 32 | 3.13 |
| 0.25 | 100 | 48 | 108.33 |
| 1 | 370 | 110 | 236.36 |
| 2 | 590 | 169 | 249.11 |
| 3 | 751 | 260 | 188.85 |
| 6 | 888 | 455 | 95.16 |
| 9 | 937 | 608 | 54.11 |
| 13 | 823 | 653 | 26.03 |
| 16 | 826 | 714 | 15.69 |
| 19 | 804 | 744 | 8.06 |

Experiment 5

Experiments of pH Changes in 1 Mol/L Carbon-Nano Synergistic Ammonium Bicarbonate Solution and Ammonium Bicarbonate Solution pH changes in 1 mol/L carbon-nano synergistic ammonium bicarbonate solution and ammonium bicarbonate solution are determined. pH of carbon-nano synergistic ammonium bicarbonate reduces by 0.532 after 2 days and 0.033 after 19 days, showed in Table 5. From the point of inhibiting ammonia evaporation and reducing $CO_2$ emission, acidized soil is better than alkalized soil. As a result of the reduced pH of soil, the amount of $H_2CO_3$ or $HCO_3^-$ ion entering plough pan or below topsoil increases, which could not only form $CaCO_3$ and $MgCO_3$ nodule, but also increase the forming amount of $CaCO_3$ nodule and $CaCO_3$ in subsoil layer and substratum.

TABLE 5 pH changes in 1 mol/L carbon-nano synergistic ammonium bicarbonate (CABC-03-03) solution and ordinary ammonium bicarbonate (ABC) solution (298K)

| Test time/d | Ordinary ammonium bicarbonate - pH value | Nano ammonium bicarbonate - pH value | pH value reduced by nano ammonium bicarbonate |
|---|---|---|---|
| 0 | 7.668 | 7.697 | −0.031 |
| 0.125 | 7.893 | 7.869 | 0.024 |
| 0.25 | 8.350 | 8.045 | 0.305 |
| 1 | 8.936 | 8.369 | 0.567 |
| 2 | 9.128 | 8.596 | 0.532 |
| 3 | 9.242 | 8.784 | 0.458 |
| 6 | 9.315 | 9.025 | 0.290 |
| 9 | 9.338 | 9.151 | 0.187 |
| 13 | 9.242 | 9.181 | 0.061 |
| 16 | 9.283 | 9.221 | 0.062 |
| 19 | 9.272 | 9.239 | 0.033 |

Experiment 6

Determination of Changes of $CO_2$ Accumulated Emission Amount of Carbon-Nano Synergistic Ammonium Bicarbonate and Urea in Soil System $CO_2$ accumulated emission amounts of carbon-nano synergistic ammonium bicarbonate (CABC) and urea (URA) are determined. As showed in Table 6, the reducing rate of $CO_2$ accumulated emission amount of URA/CABC/% is in a range from 6% to 122% in 1 d to 42 d; and the reducing rate of $CO_2$ accumulated emission amount of URA/CABC/% is 15% in 1 d to 42 d.

TABLE 6

$CO_2$ accumulated emission amount of carbon-nano synergistic ammonium bicarbonate (CABC) and urea (URA) in soil ($CO_2$—C μg/g soil)

| /d | 1 | 3 | 5 | 7 | 10 | 14 | 17 | 21 | 28 | 35 | 42 |
|---|---|---|---|---|---|---|---|---|---|---|---|
| CK (control) | 2 | 5 | 20 | 30 | 40 | 45 | 50 | 60 | 80 | 90 | 110 |
| CABC | 9 | 15 | 35 | 50 | 60 | 70 | 80 | 85 | 100 | 110 | 130 |
| URA | 20 | 30 | 50 | 60 | 75 | 80 | 85 | 90 | 110 | 120 | 150 |
| CABC/CK/% | 350 | 200 | 75 | 67 | 50 | 56 | 60 | 42 | 25 | 22 | 18 |
| URA/CABC/% | 122 | 100 | 43 | 20 | 25 | 14 | 6 | 6 | 10 | 9 | 15 |

Experiment 7

Determination of $CO_2$ Daily Emission Amount of Carbon-Nano Synergistic Ammonium Bicarbonate and Urea in Soil System

TABLE 7

$CO_2$ daily emission amount of carbon-nano synergistic ammonium bicarbonate (CABC-03-03) and urea (URA-00) in soil system ($CO_2$—C μg/g soil)

| /d | 1/d | 3/d | 5/d | 7/d | 10/d | 14/d | 17/d | 21/d | 28/d | 35/d | 42/d |
|---|---|---|---|---|---|---|---|---|---|---|---|
| CK (control) | 2.3 | 1.9 | 6.0 | 4.5 | 3.5 | 3.0 | 2.8 | 2.9 | 3.0 | 2.8 | 2.8 |
| CABC | 7.2 | 3.0 | 9.8 | 7.3 | 4.3 | 3.1 | 2.9 | 3.0 | 2.9 | 2.8 | 2.8 |
| URA | 14.3 | 9.3 | 8.0 | 5.2 | 3.8 | 3.9 | 3.7 | 3.2 | 3.1 | 3.2 | 3.2 |
| CABC/CK/% | 213 | 58 | 63 | 62 | 23 | 3 | 4 | 3 | −3 | 0 | 0 |
| URA/CABC/% | 99 | 210 | −23 | −40 | −13 | 26 | 28 | 7 | 7 | 14 | 14 |

The reducing rate of $CO_2$ daily emission amount of URA/CABC/% of carbon-nano synergistic ammonium bicarbonate and urea in soil system is in a range from −32% to 210% in 1 d to 42 d, while the reducing rate of $CO_2$ daily emission amount by URA/CABC/% is 14% during 42 d. Both carbon-nano synergistic ammonium bicarbonate and urea are carbonate-containing nitrogen fertilizer, in which 26% $CO_2$, a main source of green house gas, is emitted into atmosphere during urea synthesis process (mainly during the ammonia synthesis process). However, the $CO_2$ emitted by the ammonia synthesis is again absorbed during the preparation of carbon-nano synergistic ammonium bicarbonate, with substantially no $CO_2$ emission. Therefore, carbon-nano synergistic ammonium bicarbonate is better than urea from the point of atmospheric environment protection.

Experiment 8

Determination of Changes of Nitrous Oxide ($N_2O$—N) Accumulated Emission Amounts of Carbon-Nano Synergistic Ammonium Bicarbonate and Urea in Soil $N_2O$—N accumulated emission amounts (μg $N_2O$/g soil) by carbon-nano synergistic ammonium bicarbonate and urea are determined. As showed in Table 8, the reducing rate of $N_2O$—N accumulated emission amount of URA/CABC/% is in a range from 33% to 400% in 1 d to 63 d; while the reducing rate of $N_2O$—N accumulated emission amount of URA/CABC/% is 51% during 63 d. $N_2O$—N daily emission amounts by carbon-nano synergistic ammonium bicarbonate and urea in soil system (μg $N_2O$/g soil) are showed in Table 9, in which the reducing rate of $N_2O$—N daily emission amount of URA/CABC/% in soil system is in a range from 10% to 400% in 1 d to 63 d, while the reducing rate of $N_2O$—N emission amount of URA/CABC/% is 11% during 63 d. $N_2O$—N annual emission amount and the estimation of $N_2O$—N annual emission flux in the whole country by carbon-nano synergistic ammonium bicarbonate (CABC), ammonium bicarbonate (ABC), and urea (URA) in soil system are showed in Table 10.

TABLE 8

$N_2O$—N accumulated emission amount of carbon-nano synergistic ammonium bicarbonate (CABC-03-03) and urea (URA) in soil system (μg $N_2O$/g soil)

| /d | 1/d | 3/d | 5/d | 7/d | 10/d | 14/d | 18/d | 28/d | 35/d | 49/d | 63/d |
|---|---|---|---|---|---|---|---|---|---|---|---|
| CK (control) | 0.2 | 2 | 3 | 4 | 6 | 7 | 8 | 12 | 15 | 20 | 25 |
| CABC | 0.3 | 3 | 7 | 19 | 25 | 35 | 40 | 50 | 59 | 62 | 73 |
| URA | 0.4 | 17 | 35 | 58 | 73 | 80 | 85 | 90 | 95 | 100 | 110 |
| CABC/CK/% | 50 | 50 | 133 | 375 | 317 | 400 | 400 | 317 | 293 | 210 | 192 |
| URA/CABC/% | 33 | 467 | 400 | 205 | 192 | 129 | 113 | 80 | 61 | 61 | 51 |

TABLE 9

$N_2O$—N daily emission amount of carbon-nano synergistic ammonium bicarbonate (CABC-03-03) and urea (URA) in soil system (μg $N_2O$/g soil)

| /d | 1/d | 3/d | 5/d | 7/d | 10/d | 14/d | 18/d | 28/d | 35/d | 49/d | 63/d |
|---|---|---|---|---|---|---|---|---|---|---|---|
| CK (control) | 0.2 | 0.3 | 1.0 | 0.3 | 0.2 | 0.3 | 0.3 | 0.4 | 0.5 | 0.3 | 0.2 |
| CABC | 0.3 | 1.5 | 4.1 | 0.9 | 1.0 | 1.2 | 1.5 | 1.8 | 2.0 | 1.0 | 0.9 |
| URA | 1.5 | 6.1 | 11.8 | 4.4 | 1.8 | 1.7 | 2.2 | 2.0 | 2.2 | 1.1 | 1.0 |
| CABC/CK/% | 50 | 67 | 310 | 200 | 400 | 300 | 400 | 350 | 233 | 233 | 350 |
| URA/CABC/% | 400 | 333 | 188 | 389 | 80 | 42 | 47 | 11 | 10 | 10 | 11 |

TABLE 10

$N_2O$—N annual emission amounts (μg $N_2O/m^3$-h) and the estimation of $N_2O$—N annual emission flux in the whole country of carbon-nano synergistic ammonium bicarbonate (CABC), ammonium bicarbonate (ABC), and urea in soil system

| Fertilizer | $N_2O$—N annual emission flux range/ (μg $N_2O/m^3$-h) | Average of $N_2O$—N annual emission flux/ (μg $N_2O/m^3$-h) | $N_2O$—N emission flux/nitrogen fertilizer applied/ % | Annual total emission amount of $N_2O$—N in China/10,000 ton |
|---|---|---|---|---|
| URA | −197-2867 | 71.92 | 1.98 | 15.18 |
| ABC | −70-1291 | 70.93 | 1.36 | 12.24 |
| CABC | −68-201 | 18.99 | 0.34 | 3.06 |
| ABC:CABC | | 3.74:1 | | 4:1 |

Data determined in Table 20 are the results obtained from accumulated data in 280 days in the field environment, which is more credible. $N_2O$ emission amount of urea (URA) and ammonium bicarbonate (ABC) in soil are 1.98% and 1.36% respectively, with no much difference, while $N_2O$ emission amount by carbon-nano synergistic ammonium bicarbonate (CABC) is just 0.34%, which is 17.17% and 25.00% of the $N_2O$ annual emission amount of URA and ABC respectively. It is thus clear that carbon-nano synergistic ammonium bicarbonate could reduce the emission amount of green house gas $N_2O$ by over 70.00%.

Experiment 9

Production Increasing Effects on Eggplant and Tomato by Carbon-Nano Synergistic Ammonium Bicarbonate and Carbon-Nano Ordinary Ammonium Bicarbonate 1) Experimental treatments:
0.3% carbon-nano synergistic ammonium bicarbonate (CABC-03-03);
0.1% carbon-nano synergistic ammonium bicarbonate (CABC-01-03);
Long effective ammonium bicarbonate (LECAB);
0.3% carbon-nano ordinary ammonium bicarbonate (CABC-03-00);
0.1% carbon-nano ordinary ammonium bicarbonate (CABC-01-00);
Ordinary ammonium bicarbonate (ABC).

2) Amounts of fertilizers applied: the amount of fertilizers applied per mu is 50 kg, and the amount of fertilizers applied to each plant of eggplant seedling or tomato is 0.0165 kg.

3) Fertilizing methods: fertilizers are dissolved independently, poured to the roots of eggplant seedlings, or poured through holes and earthed up.

4) Experimental results and analysis: see Tables 11, 12, 13 and 14.

Results in Table 11 indicate that the increasing rate of plant height treated with 0.3% carbon-nano synergistic ammonium bicarbonate comparing with 0.1% carbon-nano synergistic ammonium bicarbonate is 13.17%; the increasing rate of plant height treated with 0.3% carbon-nano synergistic ammonium bicarbonate comparing with long effective ammonium bicarbonate is 17.18%; the increasing rate of plant height treated with 0.3% carbon-nano ordinary ammonium bicarbonate comparing with 0.1% carbon-nano ordinary ammonium bicarbonate is 4.89%; the increasing rate of plant height treated with 0.3% carbon-nano synergistic ammonium bicarbonate comparing with ordinary ammonium bicarbonate is 8.06%.

TABLE 11

Measurement results of eggplant seedling height treated with different fertilizer (cm)

| Treatments | Plant height 1 | Plant height 2 | Plant height 3 | Plant height 4 | Plant height 5 | Plant height 6 | Plant height 7 | Average height | Increasing rate (%) |
|---|---|---|---|---|---|---|---|---|---|
| CABC-03-03 | 58 | 70 | 73 | 70 | 78 | 84 | 65 | 71.14 | 17.18 |
| CABC-01-03 | 65 | 60 | 50 | 87 | 50 | 60 | 68 | 62.86 | 3.54 |
| LEABC | 60 | 74 | 47 | 60 | 70 | 44 | 70 | 60.71 | 0 |
| CABC-03-00 | 66 | 45 | 66 | 62 | 70 | 60 | 60 | 61.29 | 8.06 |
| CABC-01-00 | 69 | 49 | 57 | 75 | 65 | 50 | 44 | 58.43 | 3.74 |
| ABC | 64 | 64 | 32 | 75 | 65 | 61 | 62 | 56.72 | 0 |

Results in Table 12 indicate that the increasing rate of leaf number treated with 0.3% carbon-nano synergistic ammonium bicarbonate (CABC-03-03) comparing with 0.1% carbon-nano synergistic ammonium bicarbonate (CABC-01-03) is 2.98%; the increasing rate of leaf number treated with 0.3% carbon-nano synergistic ammonium bicarbonate (CABC-03-03) than with long effective ammonium bicarbonate (LECAB) is 28.37%; the increasing rate of leaf number treated with 0.3% carbon-nano ordinary ammonium bicarbonate (CABC-03-00) comparing with 0.1% ordinary carbon-nano ammonium bicarbonate (CABC-01-00) is 24.24%; the increasing rate of leaf number treated with 0.3% carbon-nano synergistic ammonium bicarbonate (CABC-03-03) than with ordinary ammonium bicarbonate (ABC) is 13.44%.

TABLE 12

Measure results of eggplant seedling leaf number treated with different fertilizers (number)

| Treatments | Leaf number 1 | Leaf number 2 | Leaf number 3 | Leaf number 4 | Leaf number 5 | Leaf number 6 | Leaf number 7 | Average leaf number | Increasing rate (%) |
|---|---|---|---|---|---|---|---|---|---|
| CABC-03-03 | 12 | 21 | 22 | 20 | 41 | 40 | 16 | 24.57 | 28.37 |
| CABC-01-03 | 40 | 23 | 2 | 35 | 9 | 28 | 30 | 23.86 | 24.66 |
| LECAB | 18 | 35 | 6 | 17 | 25 | 13 | 20 | 19.14 | 0 |
| CABC-03-00 | 24 | 15 | 17 | 24 | 29 | 18 | 32 | 24.14 | 13.44 |
| CABC-01-00 | 15 | 20 | 20 | 28 | 14 | 21 | 18 | 19.43 | −9.25 |
| ABC | 15 | 33 | 4 | 26 | 28 | 15 | 28 | 21.28 | 0 |

TABLE 13

Measure results of eggplant fruit weight treated with different fertilizers (kg)

| Treatments | Eggplant fruit weight (kg) | Increasing weight of eggplant fruit (kg) | Increasing rate (%) | |
|---|---|---|---|---|
| CABC-03-03 | 4.68 | 2.82 | 151.61 | 89.47 |
| CABC-01-03 | 2.47 | 0.61 | 32.80 | 0 |
| LECAB | 1.86 | 0 | 0 | |
| CABC-03-00 | 1.62 | 0.16 | 10.69 | 6.78 |
| CABC-01-00 | 1.52 | 0.06 | 4.11 | 0 |
| ABC | 1.46 | 0 | 0 | |

Results in Table 13 indicate that the increasing rate of eggplant fruit weight treated with 0.3% carbon-nano synergistic ammonium bicarbonate comparing with 0.1% carbon-nano synergistic ammonium bicarbonate is 89.47%; the increasing rate of eggplant fruit weight treated with 0.1% carbon-nano synergistic ammonium bicarbonate comparing with long effective ammonium bicarbonate is 32.80%; the increasing rate of eggplant fruit weight treated with 0.3% carbon-nano ordinary ammonium bicarbonate comparing with 0.1% carbon-nano ordinary ammonium bicarbonate is 6.78%; the increasing rate of eggplant fruit weight treated with 0.1% carbon-nano ammonium bicarbonate than with ordinary ammonium bicarbonate is 4.11%.

TABLE 14

Measure results of tomato weight treated with different fertilizers (kg)

| Treatments | Tomato fruit weight (kg) | Increasing weight of tomato fruit (kg) | Increasing ratio (%) |
|---|---|---|---|
| 0.2% carbon-nano long effective | 13.1 | 3.84 | 36.17 |
| 0.1% carbon-nano long effective | 9.26 | 0 | 0 |

Results in Table 14 indicate that the increasing rate of tomato fruit weight treated with 0.2% carbon-nano synergistic ammonium bicarbonate (100 g ammonium bicarbonate comprising 0.2 g carbon nanomaterials and 0.3 g DCD) comparing with 0.1% carbon-nano synergistic ammonium bicarbonate (CABC-01-03) is 36.17%.

Based on the present market price of carbon nanomaterials, there are prominent economic profits when complex fertilizer in the present invention comprises 0.1% to 0.5% carbon nanomaterials by weight. The present invention could be also accomplished and achieving the synergistic effects of emission reduction by using 0.5% to 1% carbon nanomaterials by weight.

Experiment 10

Application Effects of Carbon-Nano Synergistic Fertilizer on Field Crops

Experiments below are preceded with general fertilizing amount, and using the same fertilizing amount and the same fertilizing methods.

1. Application Effects of Carbon-Nano Synergistic Fertilizer on Winter Wheat
(1) Experimental sites: 4 regional experimental sites of winter wheat in total:
  A. Demonstration park of high quality agricultural products center, Ministry of Agriculture
  B. Yucheng experimental base of Chinese Academy of Sciences
  C. The Agricultural Science Research Institute of Daxing District, Beijing
  D. Qingyundian Station, the Agricultural Science Research Institute of Daxing District, Bejing
(2) Experimental protocols and production determination of winter wheat in every experimental site
  A. Demonstration Park of High Quality Agricultural Products Center, Ministry of Agriculture
Breed used in experiments is Beinong 9549 of Zhongchangluyuan, 7 treatments are included: control, ammonium bicarbonate, long effective ammonium bicarbonate, carbon-nano synergistic ammonium bicarbonate, urea, carbon-nano synergistic urea, and carbon-nano, repeated 3 times. Production is determined on Jun. 19, 2008, and the production determination results are showed in Table 15.

TABLE 15

Production determination results - experiments of winter wheat in the demonstration park of high quality agricultural products center, Ministry of Agriculture

| Treatments | Average production per mu/kg | Increase rate/% |
|---|---|---|
| Control | 416 | 0 |
| Carbon-nano | 470 | 12.98 |
| Long effective ammonium bicarbonate (LEABC) | 473 | 13.70 |
| Ammonium bicarbonate (ABC) | 481 | 15.63 |
| Urea (URA) | 487 | 17.07 |
| Carbon-nano synergistic ammonium bicarbonate (CABC-03-03) | 502 | 20.67 |
| Carbon-nano synergistic urea (CURA-03) | 541 | 30.05 |

B. Yucheng Experimental Base of Chinese Academy of Sciences

Winter wheat breed used is Xiaoyanhao. Experiments are orthogonal tests. Each treatment is repeated 3 times. Fertilizers used are carbon-nano synergistic fertilizer, release-control fertilizer, general compound fertilizers of nitrogen, phosphorus, potassium and the like. Experimental results are showed in Table 16.

TABLE 16

Production determination results of winter wheat Xiaoyanhao with different fertilizers

| Treatments of fertilizing | Average production/kg | Increase rate/% |
|---|---|---|
| Medium amount of amino acid fertilizer | 353 | 0 |
| Decreased amount of carbon-nano synergistic ammonium bicarbonate (CABC-03-03) | 391 | 10.76 |
| Increased amount of general fertilizer | 401 | 13.60 |
| Medium amount of carbon-nano synergistic ammonium bicarbonate (CABC-03-03) | 468 | 32.58 |

C. Qingyundian Station, the Agricultural Science Research Institute of Daxing District, Beijing Winter wheat breed used in experiments is 9428, 7 treatments are included: control, general fertilizer, ammonium bicarbonate, long effective ammonium bicarbonate, carbon-nano synergistic ammonium bicarbonate, urea, and carbon-nano synergistic urea, repeated 3 times. The production determination results are showed in Table 17.

TABLE 17

Production determination results of winter wheat in Qingyundian Station, the Agricultural Science Research Institute of Daxing District

| Treatments | Production per mu/kg | Production increasing rate/% | Production increasing rate/% |
|---|---|---|---|
| Control | 385 | 0 | |
| Ammonium bicarbonate | 397 | 3.12 | |
| General fertilizer | 401 | 4.16 | 0 |
| Long effective ammonium bicarbonate (LEABC) | 423 | 9.87 | 5.49 |
| Urea (URA) | 425 | 10.39 | 5.99 |
| Carbon-nano synergistic urea (CURA) | 442 | 14.80 | 10.22 |
| Carbon-nano synergistic ammonium bicarbonate (CABC-03-03) | 476 | 23.6 | 18.7 |

D. The Agricultural Science Research Institute of Daxing District, Beijing

Winter wheat breed used in experiments is Jing411, 8 treatments are included: control, general fertilizer, ammonium bicarbonate, long effective ammonium bicarbonate, carbon-nano synergistic ammonium bicarbonate, urea, Carbon-nano synergistic urea, and carbon-nano, repeated 3 times. The production determination results are showed in Table 18.

TABLE 18

Field production determination results of winter wheat in the Agricultural Science Research Institute of Daxing District

| Treatments | Average production per mu/kg | Production increasing rate/% (comparing with control) | Production increasing rate/% (comparing with general fertilizer) |
|---|---|---|---|
| Control | 327.75 | 0 | |
| Urea (URA) | 328.67 | 0.28 | |
| ammonium bicarbonate (ABC) | 338.69 | 3.33 | |
| General fertilizer | 354.17 | 8.06 | 0 |
| carbon-nano | 374.57 | 14.29 | 5.76 |
| Long effective ammonium bicarbonate (LEABC) | 391.06 | 19.32 | 10.42 |
| Carbon-nano synergistic urea (CURA) | 412.52 | 25.86 | 16.48 |
| Carbon-nano synergistic ammonium bicarbonate (CABC-03-03) | 437.97 | 33.73 | 23.66 |

2. Application Effects of Carbon-Nano Synergistic Fertilizer on Corn (1) Experimental Sites: Demonstration park of high quality agricultural products center, ministry of Agriculture (2) Experimental protocols and production determination of corn in the experimental site Corn breed used in experiments is Jiyuan No. 1, 7 treatments are included: control, carbon-nano, ammonium bicarbonate, carbon-nano synergistic ammonium bicarbonate, urea, Carbon-nano synergistic urea, and carbon-nano synergistic ammonium bicarbonate with equal weight of urea, repeated 3 times. The production determination results are showed in Table 19.

TABLE 19

Determination results of fresh weight of corn

| Treatments | Ear weight in the whole area/kg | Production increasing rate comparing with urea/% | Production increasing rate comparing with ammonium bicarbonate/% |
|---|---|---|---|
| Urea | 38.1 | 0 | |
| Carbon-nano | 39.1 | 2.67 | |
| Ammonium bicarbonate | 39.6 | 4.07 | 0 |
| Control | 41.6 | 9.15 | 4.88 |
| Carbon-nano synergistic urea (CURA-03) | 41.7 | 9.37 | 5.09 |
| Carbon-nano synergistic ammonium bicarbonate (CABC-03-03) (equal nitrogen) | 41.7 | 9.41 | 5.13 |
| Carbon-nano synergistic ammonium bicarbonate (CABC-03-03) (equal weight) | 42.5 | 11.47 | 7.11 |

Experiment 11

Application Effects of Carbon-Nano Synergistic Fertilizer on Vegetables

1. Application Effects of Nano Synergistic Fertilizer on Celery
(1) Deployed location of experiments: demonstration park of high quality agricultural products center, Ministry of Agriculture, China
(2) Experimental protocols and production of celery in the experimental site Breed used in experiments is Ventura celery, and 3 treatments are included for comparison: control, urea, and carbon-nano synergistic ammonium bicarbonate which is in equal weight as urea, repeated 3 times. Results are showed in Table 20. The production is 12.12% higher, and the fertilizer is saved 2.6 times, when equal weight of carbon-nano synergistic fertilizer is used.

TABLE 20

Effects of different treatments on celery production

| Treatments | Average fresh weight of plants/kg/20 plants | Fresh weight of celery per mu/kg | Production increased per mu/kg | Increase rate comparing with control/% | Increasing rate comparing with urea/% |
|---|---|---|---|---|---|
| Control | 8.87 | 5916.29 | 0 | 0 | |
| urea | 11.55 | 7703.85 | 1787.56 | 30.2 | 0 |
| Carbon-nano synergistic ammonium bicarbonate (CABC-03-03) | 12.95 | 8637.65 | 2721.36 | 46.0 | 12.12 |

2. Application Effects of Carbon-Nano Synergistic Fertilizer on Tomato
(1) Deployed location of experiments: demonstration park of high quality agricultural products center, Ministry of Agriculture, China
(2) Experimental protocols and production of tomato in the experimental site Breed used in experiments is Jinpengshengguan, and 3 treatments are included for comparison: control, urea, and carbon-nano synergistic urea, repeated 6 times. Results are showed in Table 21.

TABLE 21

Average area production determination results during growth of tomato

| Treatments | Average area production/kg | Production increasing rate/% |
| --- | --- | --- |
| Control | 99.86 | 0 |
| Urea | 109.65 | 9.80 |
| Carbon-nano synergistic urea (CURA-03) | 118.38 | 18.54 |

From results above, based on the experimental effects of winter wheat treated with different fertilizers in 4 sites, it could be seen that carbon-nano synergistic urea increases the production in a range from 4.01% to 25.51%, 13.53% on average, comparing with urea; carbon-nano synergistic ammonium bicarbonate increases the production in a range from 4.37% to 29.31%, 17.57% on average. Based on the field experiments of corn, carbon-nano synergistic ammonium bicarbonate and carbon-nano synergistic increase the production of corn by 9.37% and 11.4%, respectively. On condition that fertilizers are applied in the same weight, carbon-nano synergistic ammonium bicarbonate increase the production of celery by 12.12%, comparing with urea; carbon-nano synergistic urea increase the production of tomato by 18.54%, comparing with urea.

The invention claimed is:

1. A complex fertilizer, comprising carbon-containing-fertilizer selected from the group consisting of ammonium bicarbonate, urea, and a combination thereof, characterized in that said complex fertilizer further comprises carbon-nano powder with particle size in a range from 5 nm to 70 nm, and the weight ratio of said carbon-containing-fertilizer and said carbon-nano powder is in a range from 100:0.1 to 100:1.

2. The complex fertilizer according to claim 1, wherein the weight ratio of said carbon-containing-fertilizer and said carbon-nano powder is in a range from 100:0.1 to 100:0.5.

3. The complex fertilizer according to claim 1, wherein the weight ratio of said carbon-containing-fertilizer and said carbon-nano powder is in a range from 100:0.1 to 100:0.3.

4. The complex fertilizer according to claim 1, wherein said complex fertilizer further comprises ammonia stabilizer or nitric acid reductase inhibitor, the weight ratio of said carbon-containing-fertilizer and said ammonia stabilizer or nitric acid reductase inhibitor is in a range from 100:0.1 to 100:1, and said ammonia stabilizer or nitric acid reductase inhibitor is selected from a group consisting of dicyandiamide, dicyclohexylamine, 2-diethylaminoethanol, benzyl cyanide, glyceryl triacetate, nitroaniline, 2-chloropyridine, 3-chloroacetoacetanilide, N-nitrosodimethylamine and sulfathiazole.

5. The complex fertilizer according to claim 4, wherein said ammonia stabilizer or nitric acid reductase inhibitor is dicyandiamide.

6. The complex fertilizer according to claim 5, wherein the weight ratio of said carbon-containing-fertilizer and dicyandiamide is in a range from 100:0.1 to 100:0.5.

7. The complex fertilizer according to claim 5, wherein the weight ratio of said carbon-containing-fertilizer and dicyandiamide is in a range from 100:0.1 to 100:0.3.

8. The complex fertilizer according to claim 1, wherein said carbon-containing-fertilizer is ammonium bicarbonate, said complex fertilizer further comprises dicyandiamide, the weight ratio of said carbon-containing-fertilizer and said carbon-nano powder is in a range from 100:0.1 to 100:0.5, and the weight ratio of said carbon-containing-fertilizer and dicyandiamide is in a range from 100:0.1 to 100:0.5.

9. The complex fertilizer according to claim 8, wherein the weight ratio of said carbon-containing-fertilizer and said carbon-nano powder is in a range from 100:0.1 to 100:0.3, and the weight ratio of said carbon-containing-fertilizer and dicyandiamide is in a range from 100:0.1 to 100:0.3.

10. The complex fertilizer according to claim 1, wherein said carbon-containing-fertilizer is urea, and the weight ratio of said carbon-containing-fertilizer and said carbon-nano powder is in a range from 100:0.1 to 100:0.5.

11. The complex fertilizer according to claim 10, wherein the weight ratio of said carbon-containing-fertilizer and said carbon-nano powder is in a range from 100:0.1 to 100:0.3.

12. The complex fertilizer according to claim 2, wherein the particle size of said carbon-nano powder is in a range from 5 nm to 20 nm.

13. A compound fertilizer, characterized in that the compound fertilizer comprises the complex fertilizer according to claim 1 in an amount of 5-95% of the total weight of said compound fertilizer.

14. A compound fertilizer according to claim 13, wherein said compound fertilizer the complex fertilizer in an amount of comprises 10-95% of the total weight of said compound fertilizer.

15. A method for preparing complex fertilizer, said complex fertilizer comprising carbon-containing-fertilizer selected from the group consisting of ammonium bicarbonate, urea, and a combination thereof, characterized in that the method comprising the steps of co-crystallizing or mixing thoroughly carbon-nano powder with particle size in a range from 5 nm to 70 nm and said carbon-containing-fertilizer during carbon-containing-fertilizer preparation, in which the weight ratio of said carbon-containing-fertilizer and said carbon-nano powder is in a range from 100:0.1 to 100:1.

16. The method according to claim 15, wherein the weight ratio of said carbon-containing-fertilizer and said carbon-nano powder is in a range from 100:0.1 to 100:0.5.

17. The method according to claim 15, wherein the weight ratio of said carbon-containing-fertilizer and said carbon-nano powder is in a range from 100:0.1 to 100:0.3.

18. The method according to claim 15, wherein ammonia stabilizer or nitric acid reductase inhibitor is incorporated into said carbon-containing-fertilizer before or during the step of co-crystallizing or mixing thoroughly said carbon-nano powder and said carbon-containing-fertilizer, in which the weight ratio of said carbon-containing-fertilizer and said ammonia stabilizer or nitric acid reductase inhibitor is in a range from 100:0.1 to 100:1, and said ammonia stabilizer or nitric acid reductase inhibitor is selected from a group consisting of dicyandiamide, dicyclohexylamine, 2-diethylaminoethanol, benzyl cyanide, glyceryl triacetate, nitroaniline, 2-chloropyridine, 3-chloroacetoacetanilide, N-nitrosodimethylamine and sulfathiazole.

19. The method according to claim 18, wherein said ammonia stabilizer or nitric acid reductase inhibitor is dicyandiamide.

20. The method according to claim 19, wherein the weight ratio of said carbon-containing-fertilizer and dicyandiamide is in a range from 100:0.1 to 100:0.5.

21. The method according to claim 20, wherein the weight ratio of said carbon-containing-fertilizer and dicyandiamide is in a range from 100:0.1 to 100:0.3.

22. The method according to claim 15, wherein said carbon-containing-fertilizer is ammonium bicarbonate, and the method comprises co-crystallizing or mixing thoroughly carbon-nano powder, dicyandiamide and said ammonium bicarbonate during the preparation of ammonium bicarbonate, in which the weight ratio of said carbon-containing-fertilizer and said carbon-nano powder is in a range from 100:0.1 to 100:0.5, and the weight ratio of said carbon-containing-fertilizer and dicyandiamide is in a range from 100:0.1 to 100:0.5.

23. The method according to claim 22, wherein the weight ratio of said carbon-containing-fertilizer and said carbon-nano powder is in a range from 100:0.1 to 100:0.3, and the weight ratio of said carbon-containing-fertilizer and dicyandiamide is in a range from 100:0.1 to 100:0.3.

24. The method according to claim 15, wherein said carbon-containing-fertilizer is urea, and the method comprises co-crystallizing or mixing thoroughly carbon-nano powder and said urea during the preparation of urea, in which the weight ratio of said carbon-containing-fertilizer and said carbon-nano powder is in a range from 100:0.1 to 100:0.5.

25. The method according to claim 24, wherein the weight ratio of said carbon-containing-fertilizer and said carbon-nano powder is in a range from 100:0.1 to 100:0.3.

26. The method according to claim 15, wherein the particle size of said carbon-nano powder is in a range from 5 nm to 20 nm.

* * * * *

UNITED STATES PATENT AND TRADEMARK OFFICE
CERTIFICATE OF CORRECTION

PATENT NO. : 8,328,898 B2  Page 1 of 1
APPLICATION NO. : 12/672951
DATED : December 11, 2012
INVENTOR(S) : Liu Jian et al.

It is certified that error appears in the above-identified patent and that said Letters Patent is hereby corrected as shown below:

Column 22, line 22:

Claim 14 should read as follows:

14. A compound fertilizer according to claim 13, wherein said compound fertilizer comprises the complex fertilizer in an amount of 10-95% of the total weight of said compound fertilizer.

Signed and Sealed this
Seventeenth Day of December, 2013

Margaret A. Focarino
*Commissioner for Patents of the United States Patent and Trademark Office*